United States Patent
Finsterer

(10) Patent No.: US 10,254,128 B2
(45) Date of Patent: Apr. 9, 2019

(54) CONTROL DEVICE FOR A METER DEVICE, PARTICULARLY A WATER METER DEVICE, AND METER DEVICE, PARTICULARLY A WATER METER DEVICE

(71) Applicant: DIEHL METERING SYSTEMS GMBH, Nuremberg (DE)

(72) Inventor: Harald Finsterer, Nuremberg (DE)

(73) Assignee: Diehl Metering Systems GmbH, Nuremberg (DE)

( * ) Notice: Subject to any disclaimer, the term of this patent is extended or adjusted under 35 U.S.C. 154(b) by 0 days.

(21) Appl. No.: 15/644,998

(22) Filed: Jul. 10, 2017

(65) Prior Publication Data
US 2018/0010924 A1  Jan. 11, 2018

(30) Foreign Application Priority Data

Jul. 9, 2016 (DE) .................. 10 2016 008 461

(51) Int. Cl.
*G08B 29/00* (2006.01)
*G08C 15/10* (2006.01)
(Continued)

(52) U.S. Cl.
CPC .......... *G01D 4/004* (2013.01); *G01F 15/0755* (2013.01); *G08C 15/10* (2013.01);
(Continued)

(58) Field of Classification Search
CPC .... G01D 4/004; G08C 15/10; G01F 15/0755; G01F 15/063
(Continued)

(56) References Cited

U.S. PATENT DOCUMENTS

2011/0251807 A1*  10/2011  Rada .................. G01D 4/00
                                                    702/61
2014/0100879 A1*  4/2014  Kharebov ........... G06F 19/3418
                                                    705/3
2016/0202722 A1*  7/2016  Kuwata .................. H04J 14/00
                                                    713/501

FOREIGN PATENT DOCUMENTS

DE   102007017985 A1  10/2008
EP        0382026 A1   8/1990
WO     2008122408 A2  10/2008

OTHER PUBLICATIONS

De Langen et al., "Fault-Tolerant Bus System for Airbag Sensors and Actuators" S.Vassiliadis et al. (Eds): SAMOS 2006, LNC 4017, pp. 485-489,Springer-Verlag Berlin Heidelberg 2006.

(Continued)

*Primary Examiner* — Tanmay K Shah
(74) *Attorney, Agent, or Firm* — Laurence A. Greenberg; Werner H. Stemer; Ralph E. Locher

(57) ABSTRACT

A control device for a meter device, particularly a water meter device, includes a first data interface for a meter unit measuring a flow of a fluid of the meter device, a second data interface for a reading device communicating with the meter unit through the control device, and a supply interface receiving a combined clock and voltage supply signal for the control device. The control device can assume a read mode in which data at the first data interface can be transmitted by the control device to the second data interface upon receiving a clock and voltage supply signal having a read signal variation. The control device can additionally assume a write mode in which data at the second data interface can be transmitted to the first data interface upon receiving a clock and voltage supply signal with a write signal variation different from the read signal variation.

19 Claims, 2 Drawing Sheets

(51) Int. Cl.
  *G01D 4/00* (2006.01)
  *G01F 15/075* (2006.01)
  *G08C 19/16* (2006.01)
  *G01F 15/06* (2006.01)
(52) U.S. Cl.
  CPC ............ *G01F 15/063* (2013.01); *G08B 29/00* (2013.01); *G08C 19/16* (2013.01)
(58) Field of Classification Search
  USPC .................................................. 340/870.02
  See application file for complete search history.

(56) References Cited

OTHER PUBLICATIONS

Zimmermann et al., "Bussysteme in der Fahrzeugtechnik—Protokolle, Standards and Softwarearchitektur", Springer Vieweg, 5th Edition, 2014—English abstract.
UCAlug Open SG, "A Framework for Automated Data Exchange (ADE)" Version: Draft v.01, May 26, 2009 pp. 1-25.

* cited by examiner

CONTROL DEVICE FOR A METER DEVICE, PARTICULARLY A WATER METER DEVICE, AND METER DEVICE, PARTICULARLY A WATER METER DEVICE

CROSS-REFERENCE TO RELATED APPLICATION

This application claims the priority, under 35 U.S.C. § 119, of German Patent Application DE 10 2016 008 461.8, filed Jul. 9, 2016; the prior application is herewith incorporated by reference in its entirety.

BACKGROUND OF THE INVENTION

Field of the Invention

The invention relates to a control device for a meter device, particularly a water meter device, including a first data interface for a meter unit configured for measuring a flow of a fluid of the meter device, a second data interface for a reading device communicating with the meter unit through the control device, and a supply interface to which a combined clock and voltage supply signal for the control device can be applied, the control device being configured for assuming a read mode in which data provided at the first data interface can be transmitted by the control device to the second data interface, upon receiving a clock and voltage supply signal with a read signal variation. In addition, the invention relates to a meter device, particularly a water meter device.

Such a control device is used for providing a possible connection between a reading device and a meter unit measuring the flow of a fluid, the reading device and the meter unit being operated in accordance with different communication protocols. In other words, the control device handles an adapter function between the meter unit which can be connected at a first data interface, and the reading device which can be connected at a second data interface. It is particularly in the United States that reading devices are operated in accordance with the so-called ADE protocol in order to read out data from the meter unit. In that context, when a combined clock and voltage supply signal is applied with a predetermined read signal variation, the control device is placed into a read mode in which data provided at the first data interface—that is to say by the meter unit—can be transmitted to the second data interface—that is to say to the reading device.

However, conventional control devices are solidly connected to the meter unit, for example by molding together both components. Modifications of the meter unit are thus not possible without a complete exchange of a meter device including the control device and the meter unit.

SUMMARY OF THE INVENTION

It is accordingly an object of the invention to provide a control device for a meter device, particularly a water meter device, and a meter device, particularly a water meter device, which overcome the hereinafore-mentioned disadvantages of the heretofore-known devices of this general type and which specify a possibility for simplified maintainability of conventional meter devices.

With the foregoing and other objects in view there is provided, in accordance with the invention, a control device for a meter device, particularly a water meter device, comprising a first data interface for a meter unit configured for measuring the flow of a fluid of the meter device, a second data interface for a reading device communicating with the meter unit through the control device, and a supply interface to which a combined clock and voltage supply signal for the control device can be applied, the control device being configured for assuming a read mode in which data provided at the first data interface can be transmitted by the control device to the second data interface upon receiving a clock and voltage supply signal having a read signal variation. The control device is additionally configured for assuming a write mode, in which data provided at the second data interface can be transmitted to the first data interface upon receiving a clock and voltage supply signal with a write signal variation different from the read signal variation.

The invention is based on the consideration to expand the control device, usually configured only for unidirectional operation, by a write mode and thus to implement bidirectional communication between the reading device and the meter unit. This advantageously enables data such as altered operating parameter configurations and/or firmware updates to be transmitted to the meter unit and thus a maintenance of the meter unit without having to exchange the complete meter device. The control unit is configured, for example, to evaluate a signal variation present at the supply interface to see whether the read signal variation or the write signal variation is present and to allow a data transfer between the first data interface and the second data interface in accordance with the evaluated mode. The control device can also be configured to assume a rest mode when lacking a clock and voltage supply signal or when applying a clock and voltage supply signal which corresponds neither to the read signal variation nor to the write signal variation.

The meter unit, which is preferably configured for measuring the flow of water as the fluid, can be connectable to the control device through the first data interface. Furthermore, both conventional pure reading devices i.e. those which are only configured for reading out data from the meter unit can be connected to the second data interface, as well as combined reading devices for a reading and writing operation, and pure writing devices. Pure reading devices provided for conventional control devices thus remain completely compatible with the control device according to the invention.

The control device can include a microcontroller which is configured for controlling the data transmission between the first data interface and the second data interface. For this purpose, individual inputs and/or outputs of the microcontroller can be connected to the respective data interface. Additional transistor circuits can be connected ahead of these for the purpose of level matching and/or impedance matching between the first data interface and/or the second data interface, on one hand, and the inputs and/or outputs, on the other hand.

In the case of the control device according to the invention, it is also preferred if, in the write mode, data provided at the first data interface in the write mode can be additionally transmitted to the second data interface. The write mode can thus also be considered or designated as a read and write mode. In order to facilitate a synchronization between the reading device and the control device, it can also be provided that after assuming the write mode, data including operating information of the meter device can be transmitted to the second data interface. After assuming the write mode, the control device can thus provide firstly, in particular, identification data and/or a software version used and/or error data, particularly the number of errors which have occurred, and/or utilization data, particularly the operating information describing the number of reading processes already performed, to the second data interface. This preferably occurs within the context of a "handshake" with the reading device at the beginning of the write mode.

The read signal variation suitably includes an alternating signal having a read frequency and/or the write signal variation includes an alternating signal having a write frequency which, in particular, is different from the read frequency. Such an alternating signal can alternate between a high logic level and a low logic level, wherein a zero potential does not necessarily have to be located between the logic levels. The respective alternating signal can be trapezoidal or rectangular. In order to guarantee compatibility with conventional reading devices, the read frequency can be at least 200 Hz, preferably at least 250 Hz, particularly preferably at least 400 Hz and/or maximally 2000 Hz. Furthermore, the write frequency can be at least 2000 Hz, particularly at least 4000 Hz and/or maximally 10000 Hz, preferably maximally 5000 Hz. The read frequency can also be dependent on the voltage of a logic level, particularly the high logic level. Alternatively or additionally, for guaranteeing as high a compatibility as possible, it can be provided that the read signal variation includes a direct signal preceding the alternating signal, particularly lasting a signal duration of 500 ms at the most. In this context, a direct signal can be considered to be a signal variation having a level which changes by not more than 10% of the difference of the logic levels from the high logic level. By providing the preceding direct signal, an adequate period of time is advantageously available for initializing the control device and/or evaluating whether the read mode or the write mode is to be assumed. It is also conceivable that the write signal variation includes such a direct signal.

While the second data interface can be operated preferably in accordance with the ADE protocol, it is preferred with regard to the first data interface if the meter unit can be connected to the first data interface through a transistor-transistor logic bus system, especially having a transmission rate of 300 or 2400 Baud. Alternatively or additionally, the first data interface can be operated in accordance with the M bus protocol.

Finally, it is advantageous in the case of the control device according to the invention if the first data interface has separate write and read terminals for connecting the meter unit and/or the second data interface has a combined write and read line for connecting the reading device. This ensures as extensive as possible an interoperability of existing reading devices and meter units with the control device according to the invention. The second data interface and/or the supply interface and/or an earth or ground terminal of the control device are typically constructed for connecting to a common plug-in connector at the reading device.

With the objects of the invention in view, there is concomitantly provided a meter device, particularly a water meter device, including a meter unit configured for measuring the flow of a fluid, and a control device according to the invention, wherein the meter unit is connected to the first data interface of the control device. All embodiments relating to the control device according to the invention can be transferred analogously to the meter device according to the invention so that the aforementioned advantages can also be achieved by using the latter.

Other features which are considered as characteristic for the invention are set forth in the appended claims.

Although the invention is illustrated and described herein as embodied in a control device for a meter device, particularly a water meter device, and a meter device, particularly a water meter device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
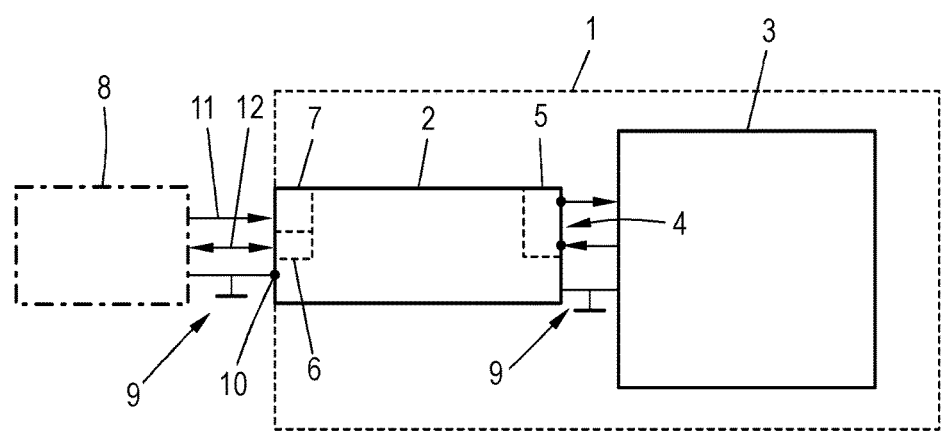
FIG. 1 is a basic block diagram of a meter device according to the invention, including a control device according to the invention.

Referring now to the figures of the drawings in detail and first, particularly, to FIG. 1 thereof, there is seen a basic diagram of a meter device 1 including a control device 2 and a meter unit 3. The meter unit 3 is configured for measuring the flow of water so that the meter device 1 can also be considered or designated as a water meter device and the meter unit 3 as a water meter unit.

The meter unit 3 is connected to a first data interface 5 of the control device 2 through separate write and read terminals 4. The meter unit 3 is linked through a transistor-transistor logic bus system, having a transmission rate of 300 or 2400 Baud, to the first data interface 5 which can be operated in accordance with the M-Bus protocol. The control device 2 also has a second data interface 6, which can be operated in accordance with the ADE protocol, and a supply interface 7 to which an external reading device 8 can be connected. In addition, an earth or ground connection 9 is provided between the control device 2 and the meter unit 3 and between the control device 2 and the reading device 8. The second data interface 6, the supply interface 7 and an earth or ground terminal 10 are also configured for connection to a common plug-in connector of the reading device 8. The control device 2 includes a non-illustrated microcontroller which is configured for controlling the data transmission between the first data interface 5 and the second data interface 6. Individual inputs and outputs of the microcontroller are preceded by transistor circuits for level and impedance matching.

A combined clock and voltage supply signal 11 (compare FIGS. 2 and 3) of the control device 2 can be applied to the supply interface 7 by the reading device 8. Furthermore, data which can be transmitted by the control device 2 from the first data interface 5 to the second data interface 6 and conversely are exchanged bidirectionally by using a data signal 12 between the second data interface 6 and the reading device 8. For this purpose, the control device 2 can be placed into a read mode and into a write mode in dependence on the clock and voltage supply signal 11. The control device 2 thus evaluates the clock and voltage supply signal 11 and switches into the corresponding mode.

Figure 2:
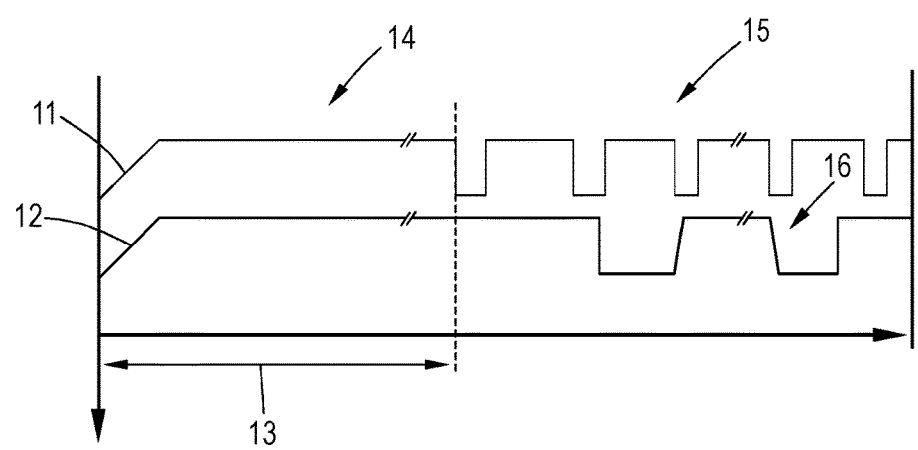
FIG. 2 is a diagram showing signal time variations at a second data interface, and a supply interface of the control device when assuming the read mode.

FIG. 2 shows a signal variation, waveform or course over time of the clock and voltage supply signal 11 and of the data signal 12 upon assuming the read mode on the basis of a rest mode. The clock and voltage supply signal 11 then describes a read signal variation which is evaluated by the control device 2 for the selection of the mode. For this purpose, the read signal variation initially includes a direct signal 14 for a signal duration 13 of 500 ms at the most, with a ramp-shaped rise being represented initially for a short period of time after the application of the clock and voltage supply signal 11 for illustrating a settling process. After the signal duration 13 has elapsed, the read signal variation includes a rectangular alternating signal 15 with a read frequency of between 250 Hz and 2000 Hz, wherein the duty ratio between the high logic level and the low logic level does not have to be precisely 50%.

During the signal period 13 and two clock cycles of the alternating signal 15, the data signal 12 is clearly at a high logic level. In this time interval, there is thus no data transmission between the first data interface 5 and the second data interface 6, but a data communication can still take place between the control device 2 and the meter unit 3 through the first data interface 4 for an initialization process. Subsequently, the control device 2 has assumed its read mode so that only diagrammatically shown data 16 can be transmitted from the first data interface 5 to the second data interface 6 and thus from the meter unit 3 to the reading device 8 with the data signal 12.

Figure 3:
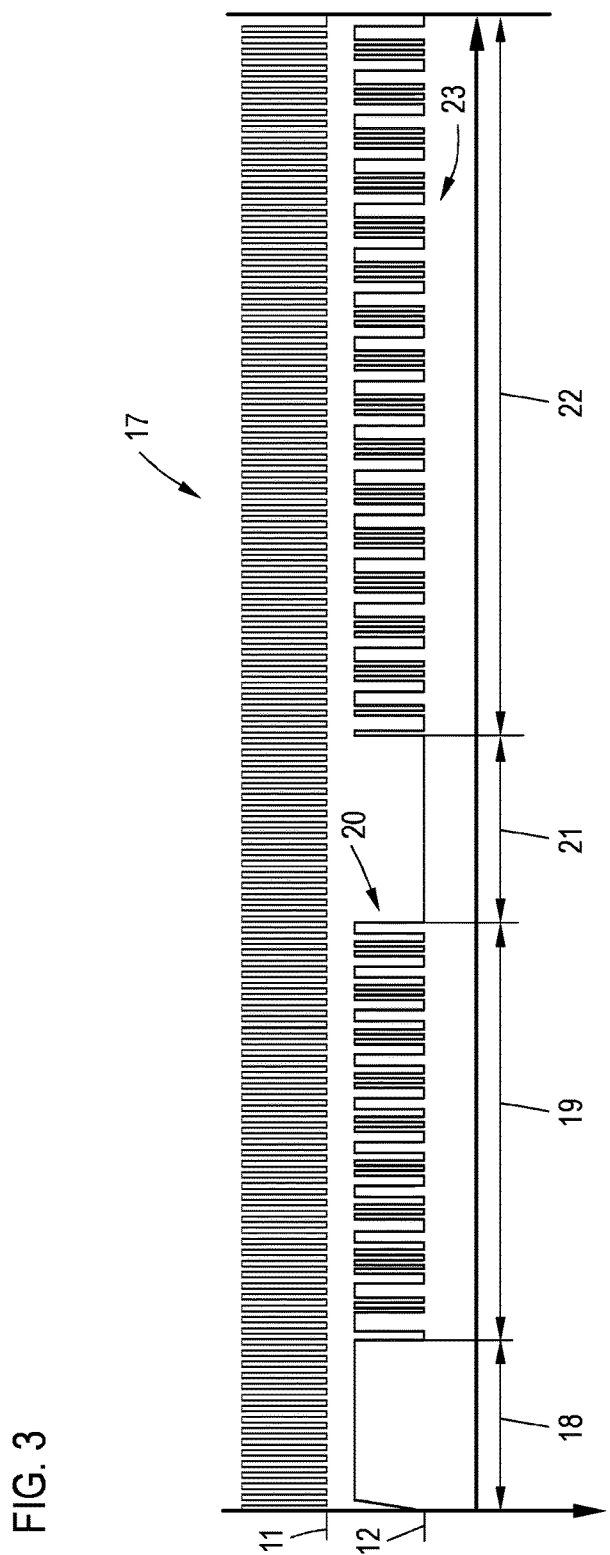
FIG. 3 is a diagram showing signal time variations at the second data interface and the supply interface of the control device when assuming the write mode.

FIG. 3 shows the signal variation with time of the clock and voltage supply signal 11 and of the data signal 12 upon assumption of the write mode starting from the rest mode. In this case, the clock and voltage supply signal 11 describes a write signal variation which includes during the entire period of its presence at the supply interface 7 an alternating signal 17 with a write frequency of between 2000 Hz and 10000 Hz, preferably between 4000 Hz and 5000 Hz. During a signal period 17 of approximately 20 ms, the control device 2 evaluates the clock and control supply signal 11 with respect to the write signal variation being present and then assumes the write mode. In this time, the data signal 12 assumes its high logic level only after a short ramp-shaped rise, again representing the settling process.

During a subsequent signal period 18 of approximately 60 ms, data 19 including initially operating information of the meter device 1 are transmitted to the second data interface 6. This operating information includes identification data, a software version being used, error data, including the number of errors which have occurred and utilization data including the number of reading processes already performed. Thus, a "handshake" is performed between the reading device 8 and the meter unit 3. In this context, it should also be pointed out that in the write mode, data can also be transmitted from the meter unit 3 to the reading device 8 so that the write mode can also be considered or designated as a read and write mode.

After a further signal period 20 of approximately 20 ms, in which the data signal 12 is at its low logic level, data 22 are transmitted from the second data interface 6 to the first data interface 5, i.e. from the reading device 8 to the target unit 3, for a signal period 21, with the signal period 21 lasting to the end of the presence of the clock and control signal 11. The control device 2 then changes again into the rest mode.

The following is a summary list of reference numerals and the corresponding structure used in the above description of the invention:

1 Meter device
2 Control device
3 Meter unit
4 Read terminal
5 Data interface
6 Data interface
7 Supply interface
8 Reading device
9 Earth connection
10 Earth terminal
11 Voltage supply signal
12 Data signal
13 Signal period
14 Direct signal
15 Alternating signal
16 Data
17 Alternating signal
18 Signal period
19 Data
20 Signal period
21 Signal period
22 Data
23 Data

The invention claimed is:

1. A control device for a meter device or a water meter device, the control device comprising:
a first data interface for a meter unit configured for measuring a flow of a fluid of the meter device;
a second data interface for a reading device communicating with the meter unit through the control device; and
a supply interface to which a combined clock and voltage supply signal for the control device can be applied;
the control device being configured for assuming a read mode in which data provided at said first data interface can be transmitted by the control device to said second data interface upon receiving a clock and voltage supply signal having a read signal variation; and
the control device being additionally configured for assuming a write mode in which data provided at said second data interface can be transmitted to said first data interface upon receiving a clock and voltage supply signal with a write signal variation different from the read signal variation.

2. The control device according to claim 1, wherein data provided at said first data interface can be additionally transmitted to said second data interface in the write mode.

3. The control device according to claim 2, wherein data including operating information of the meter device can be transmitted to the second data interface after assuming the write mode.

4. The control device according to claim 1, wherein the read signal variation includes an alternating signal having a read frequency and the write signal variation includes an alternating signal having a write frequency.

5. The control device according to claim 1, wherein the read signal variation includes an alternating signal having a read frequency or the write signal variation includes an alternating signal having a write frequency.

6. The control device according to claim 4, wherein the write frequency is different from the read frequency.

7. The control device according to claim 5, wherein the write frequency is different from the read frequency.

8. The control device according to claim 4, wherein:
the read frequency is at least 250 Hz or at most 2000 Hz or at least 250 Hz and at most 2000 Hz; and
the write frequency is at least 2000 Hz or at least 4000 Hz or at most 10000 Hz or at most 5000 Hz.

9. The control device according to claim 5, wherein:
the read frequency is at least 250 Hz or at most 2000 Hz or at least 250 Hz and at most 2000 Hz; and
the write frequency is at least 2000 Hz or at least 4000 Hz or at most 10000 Hz or at most 5000 Hz.

10. The control device according to claim 4, wherein the read signal variation includes a direct signal preceding the alternating signal.

11. The control device according to claim 5, wherein the read signal variation includes a direct signal preceding the alternating signal.

12. The control device according to claim 10, wherein the direct signal lasts for a signal period of maximally 500 ms.

13. The control device according to claim 11, wherein the direct signal lasts for a signal period of maximally 500 ms.

14. The control device according to claim 1, which further comprises a transistor-transistor logic bus system for connecting the meter unit to said first data interface.

15. The control device according to claim 14, wherein said transistor-transistor logic bus system has a transmission rate of 300 or 2400 Baud.

16. The control device according to claim 1, wherein said first data interface has separate write and read terminals for connecting the meter unit and said second data interface has a combined write and read line for connecting the reading device.

17. The control device according to claim 1, wherein said first data interface has separate write and read terminals for connecting the meter unit or said second data interface has a combined write and read line for connecting the reading device.

18. A meter device or water meter device, comprising:
a control device according to claim 1; and
a meter unit connected to said first data interface of said control device, said meter unit being configured for measuring a flow of a fluid.

19. The control device according to claim 1, wherein said first data interface, said second data interface and said supply interface are wired connections.

* * * * *